(12) United States Patent
Reeves et al.

(10) Patent No.: US 10,846,902 B2
(45) Date of Patent: Nov. 24, 2020

(54) PRESERVING THE STATE OF AN AVATAR ASSOCIATED WITH A PHYSICAL LOCATION IN AN AUGMENTED REALITY ENVIRONMENT

(71) Applicant: IMVU, Inc., Redwood City, CA (US)

(72) Inventors: Peter Kevin Reeves, San Mateo, CA (US); Robert Rui Otani, San Jose, CA (US)

(73) Assignee: IMVU, INC., Redwood City, CA (US)

( * ) Notice: Subject to any disclaimer, the term of this patent is extended or adjusted under 35 U.S.C. 154(b) by 0 days.

(21) Appl. No.: 16/289,629

(22) Filed: Feb. 28, 2019

(65) Prior Publication Data

US 2019/0272661 A1 Sep. 5, 2019

Related U.S. Application Data

(60) Provisional application No. 62/637,578, filed on Mar. 2, 2018.

(51) Int. Cl.
*G06T 13/40* (2011.01)
*H04L 29/06* (2006.01)
*H04L 29/08* (2006.01)
*G06F 3/0481* (2013.01)
*G06T 19/00* (2011.01)

(52) U.S. Cl.
CPC ......... *G06T 13/40* (2013.01); *G06F 3/04815* (2013.01); *G06T 19/006* (2013.01); *H04L 63/10* (2013.01); *H04L 67/18* (2013.01)

(58) Field of Classification Search
CPC ... G06T 13/40; G06T 19/006; G06F 3/04815; H04L 63/10; H04L 67/18
See application file for complete search history.

(56) References Cited

U.S. PATENT DOCUMENTS

| | | | |
|---|---|---|---|
| 2006/0105838 A1 | 5/2006 | Mullen | |
| 2008/0158232 A1* | 7/2008 | Shuster | G06T 13/40 345/474 |
| 2013/0194304 A1 | 8/2013 | Latta et al. | |
| 2013/0198210 A1* | 8/2013 | Lee | G06F 16/95 707/755 |
| 2013/0249947 A1* | 9/2013 | Reitan | G06F 3/011 345/633 |

(Continued)

OTHER PUBLICATIONS

Unfoldlabs Inc., "The Future of Reality-Augmented, Virtual or Mixed?"—Sep. 9, 2017—from http://unfoldlabs.com/blogs/The-Future-of-Reality-Augmented-Virtual-or-Mixed-blog-25.html—see attached document.

*Primary Examiner* — Abderrahim Merouan
(74) *Attorney, Agent, or Firm* — DLA Piper LLP (US)

(57) ABSTRACT

A method and apparatus are disclosed for generating an avatar in an augmented reality environment on a computing device, associating that avatar with a particular physical location, configuring the avatar to perform certain actions, configuring access rights for the avatar, and then storing the state of the avatar. At a later time, the user of another computing device visits the same physical location, views the physical location through the computing device, and the avatar is inserted into the image on the display of computing device and then performs the actions previously specified.

22 Claims, 10 Drawing Sheets

(56) References Cited

U.S. PATENT DOCUMENTS

| | | | |
|---|---|---|---|
| 2014/0015858 A1* | 1/2014 | Chiu | G09G 5/026 345/633 |
| 2014/0068462 A1* | 3/2014 | Chang | H04L 41/22 715/753 |
| 2015/0143487 A1 | 5/2015 | Nathan et al. | |
| 2015/0371447 A1 | 12/2015 | Yasutake | |
| 2018/0005450 A1 | 1/2018 | Daniels et al. | |

* cited by examiner

Avatar Image 510

Data Structure 460

- Object 501a
  - Object Identifier 502a
  - Appearance Sub-Object 503
    - Characteristic 504
    - Characteristic 505
    - Characteristic 506
  - Action Sub-Object 507
    - Characteristic 508
    - Characteristic 509
  - Location Sub-Object 510
    - Characteristic 511
    - Characteristic 512
  - ⋮

FIGURE 6B

Data Structure 460

- Object 501a
  - Object Identifier 502a
  - Appearance Sub-Object 503
    - Characteristic 504
    - Characteristic 505
    - Characteristic 506
  - Action Sub-Object 507
    - Characteristic 508
    - Characteristic 509
  - Location Sub-Object 510
    - Characteristic 511
    - Characteristic 512
  - ...
- Object 501b
  - Object Identifier 502b
  - Appearance Sub-Object 503
    - Characteristic 504
    - Characteristic 505
    - Characteristic 506
  - Action Sub-Object 513
    - Characteristic 514
    - Characteristic 515
  - Location Sub-Object 516
    - Characteristic 517
    - Characteristic 518
  - Access Sub-Object 519
    - Characteristic 520
  - ...
- ...

Data Structure 430

- Object 601a
  - Object Identifier 602a
  - Location Data 603
  - Avatar Object Identifier 502b
- ...

Client Device 100a

Avatar Image 630

FIGURE 8

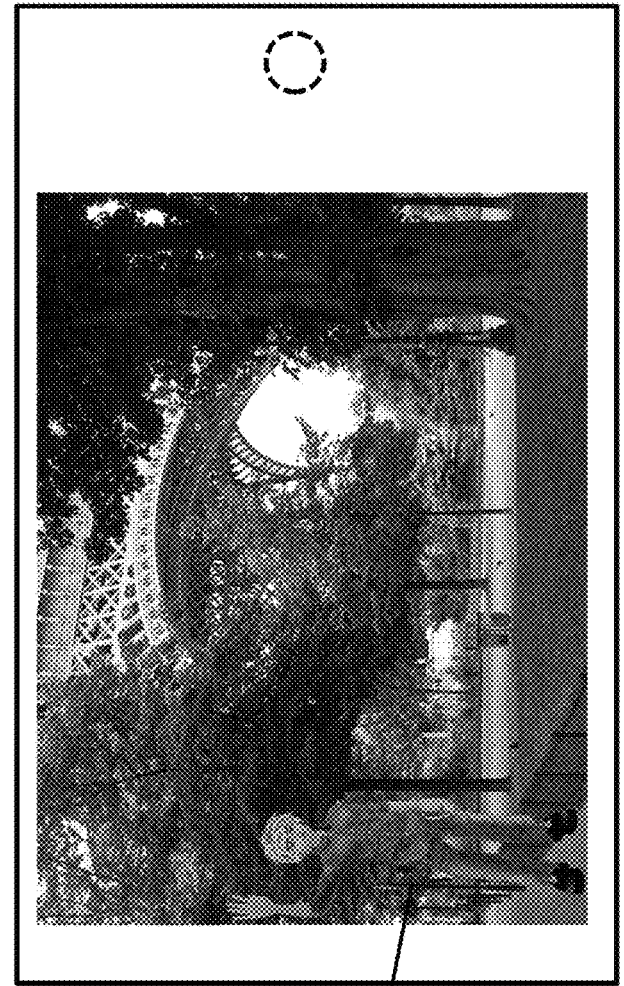

Data Structure 460
- Object 501a
  - Object Identifier 502a
  - Appearance Sub-Object 503
    - Characteristic 504
    - Characteristic 505
    - Characteristic 506
  - Action Sub-Object 507
    - Characteristic 508
    - Characteristic 509
  - Location Sub-Object 510
    - Characteristic 511
    - Characteristic 512
  ⋮
- Object 501b
  - Object Identifier 502b
  - Appearance Sub-Object 503
    - Characteristic 504
    - Characteristic 505
    - Characteristic 506
  - Action Sub-Object 513
    - Characteristic 514
    - Characteristic 515
  - Location Sub-Object 516
    - Characteristic 517
    - Characteristic 518
  - Access Sub-Object 519
    - Characteristic 520
  ⋮

Data Structure 430
- Object 601a
  - Object Identifier 602a
  - Location 603
  ⋮

Client Device 100c

Avatar Image 630

PRESERVING THE STATE OF AN AVATAR ASSOCIATED WITH A PHYSICAL LOCATION IN AN AUGMENTED REALITY ENVIRONMENT

PRIORITY CLAIM

This application claims priority to U.S. Provisional Patent Application No. 62/637,578, titled "Preserving the State of an Avatar Associated With a Physical Location in an Augmented Reality Environment" and filed on Mar. 2, 2018, which is incorporated by reference herein.

TECHNICAL FIELD

A method and apparatus are disclosed for generating an avatar in an augmented reality environment on a computing device, associating that avatar with a particular physical location, configuring the avatar to perform certain actions, configuring access rights for the avatar, and then storing the state of the avatar. At a later time, the user of another computing device visits the same physical location, views the physical location through the computing device, and the avatar is inserted into the image on the display of computing device and then performs the actions previously specified.

BACKGROUND OF THE INVENTION

Computer-generated avatars are known in the prior art. An avatar is a graphical representation of a user. Avatars sometimes are designed to be an accurate and realistic representation of the user, and sometimes they are designed to look like a character that does not resemble the user. Applicant is a pioneer is in the area of avatar generation in virtual reality (VR) applications. In these applications, a user can generate an avatar and then interact with a virtual world, including with avatars operated by other users, by directly controlling the avatar. Augmented reality (AR) applications also are known in the prior art. AR applications utilize computing devices with one or more image capture units (e.g., cameras) to provide a live view of a physical real-world environment whose elements are augmented with computer-generated images, sounds, or other sensory features.

To date, there have been very few applications that combine the use of avatars with AR applications. In instances where those technologies have been combined, the user needs to control his or her avatar in real-time within the AR application. That is, if the user is not actively controlling the avatar, the avatar will not exist or will be completely idle and unable to interact with other avatars or users.

What is lacking in the prior art is the ability to place an avatar into a physical location in an AR environment and to have that avatar persist in that location even after the user is no longer controlling that avatar. What is further needed is the ability for a user to configure the avatar to perform certain actions if and when it is viewed by another user who has access rights to that avatar.

SUMMARY OF THE INVENTION

A method and apparatus are disclosed for generating an avatar in an augmented reality environment on a computing device, associating that avatar with a particular physical location, configuring the avatar to perform certain actions, configuring access rights for the avatar, and then storing the state of the avatar. At a later time, the user of another computing device visits the same physical location, views the physical location through the computing device, and the avatar is inserted into the image on the display of computing device and then performs the actions previously specified.

BRIEF DESCRIPTION OF THE DRAWINGS

FIG. 6B depicts the placement of an avatar at the first physical location using the client application on the first client device.
FIG. 8 depicts an interaction between a third user using the client application on a third client device at the first physical location

DETAILED DESCRIPTIONS OF THE PREFERRED EMBODIMENTS

Figure 1:
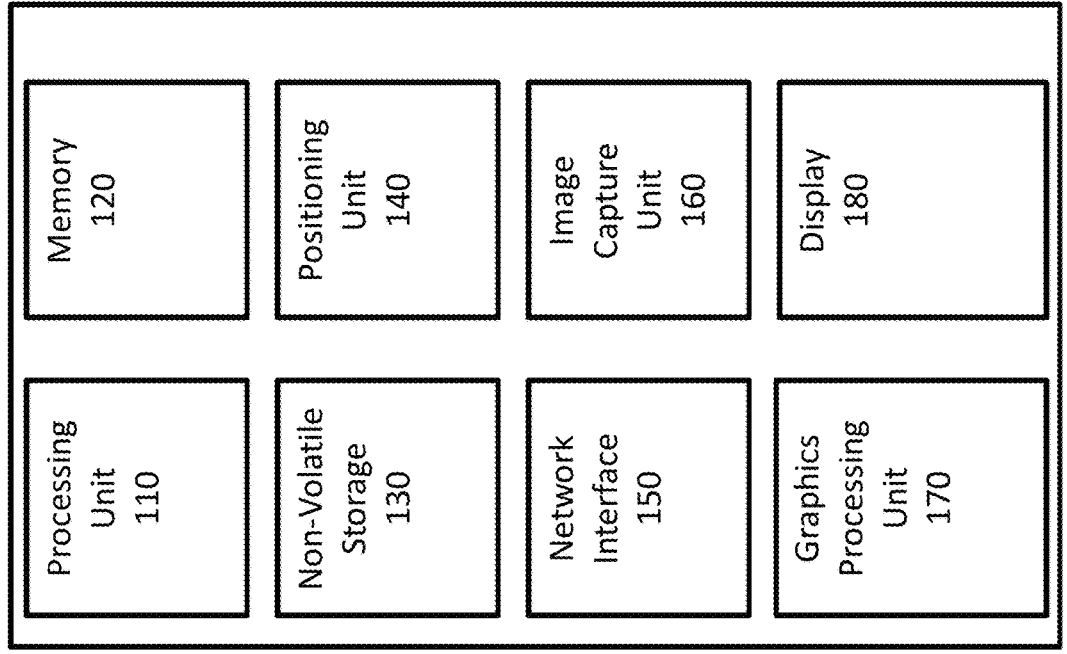
FIG. 1 depicts hardware components of a client device.

FIG. 1 depicts hardware components of client device 100. These hardware components are known in the prior art. Client device 100 is a computing device that comprises processing unit 110, memory 120, non-volatile storage 130, positioning unit 140, network interface 150, image capture unit 160, graphics processing unit 170, and display 180. Client device 100 can be a smartphone, notebook computer, tablet, desktop computer, gaming unit, wearable computing device such as a watch or glasses, or any other computing device.

Processing unit 110 optionally comprises a microprocessor with one or more processing cores. Memory 120 optionally comprises DRAM or SRAM volatile memory. Non-volatile storage 130 optionally comprises a hard disk drive or flash memory array. Positioning unit 140 optionally comprises a GPS unit or GNSS unit that communicates with GPS or GNSS satellites to determine latitude and longitude coordinates for client device 100, usually output as latitude data and longitude data. Network interface 150 optionally comprises a wired interface (e.g., Ethernet interface) or wireless interface (e.g., 3G, 4G, GSM, 802.11, protocol known by the trademark "BLUETOOTH," etc.). Image capture unit 160 optionally comprises one or more standard cameras (as is currently found on most smartphones and notebook computers). Optionally, image capture unit 160 can comprise a camera on one side of client device 100 and another camera on the opposite side of client device 100. Graphics processing unit 170 optionally comprises a controller or processor for generating graphics for display. Display 180 displays the graphics generated by graphics processing unit 170, and optionally comprises a monitor, touchscreen, or other type of display.

Figure 2:
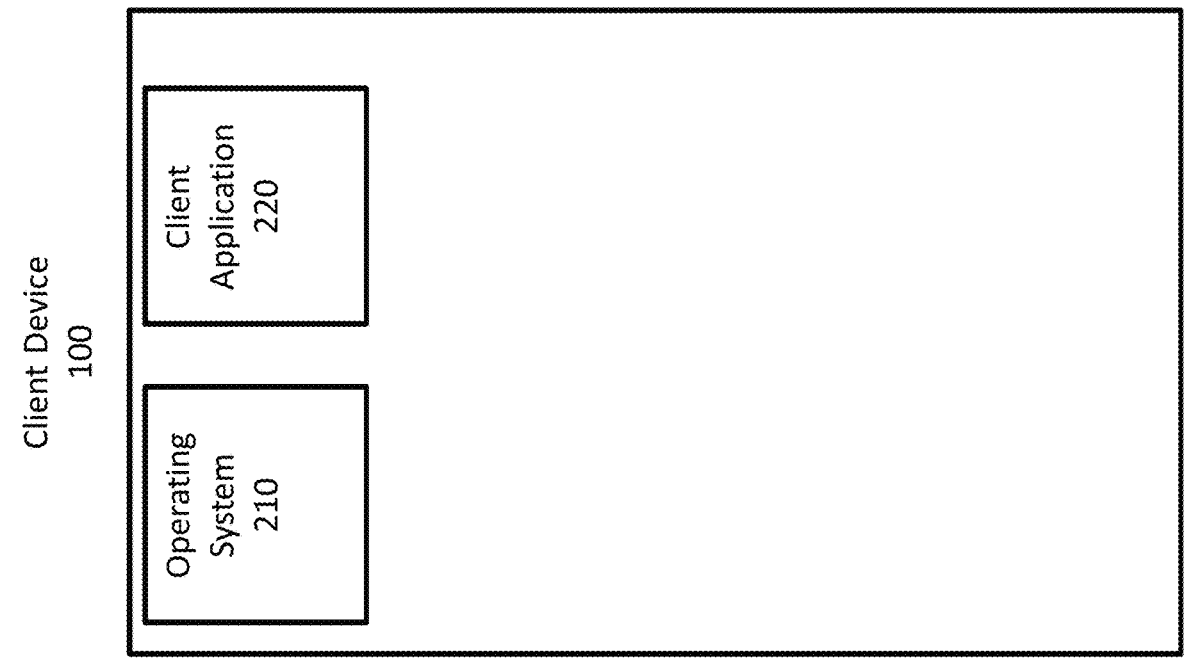
FIG. 2 depicts software components of the client device.

FIG. 2 depicts software components of client device 100. Client device 100 comprises operating system 210 (such as the operating systems known by the trademarks "WIN- DOWS," "LINUX," "ANDROID," "IOS," or others) and client application 220. Client application 220 comprises lines of software code executed by processing unit 110 and/or graphics processing unit 170 to perform the functions described below. For example, client device 100 can be a smartphone sold with the trademark "GALAXY" by Samsung or "IPHONE" by Apple, and client application 220 can be a downloadable app installed on the smartphone or a browser running code obtained from server 300 (described below). Client device 100 also can be a notebook computer, desktop computer, game system, or other computing device, and client application 220 can be a software application running on client device 100 or a browser on client device 100 running code obtained from server 300. Client application 220 forms an important component of the inventive aspect of the embodiments described herein, and client application 220 is not known in the prior art.

Figure 3:
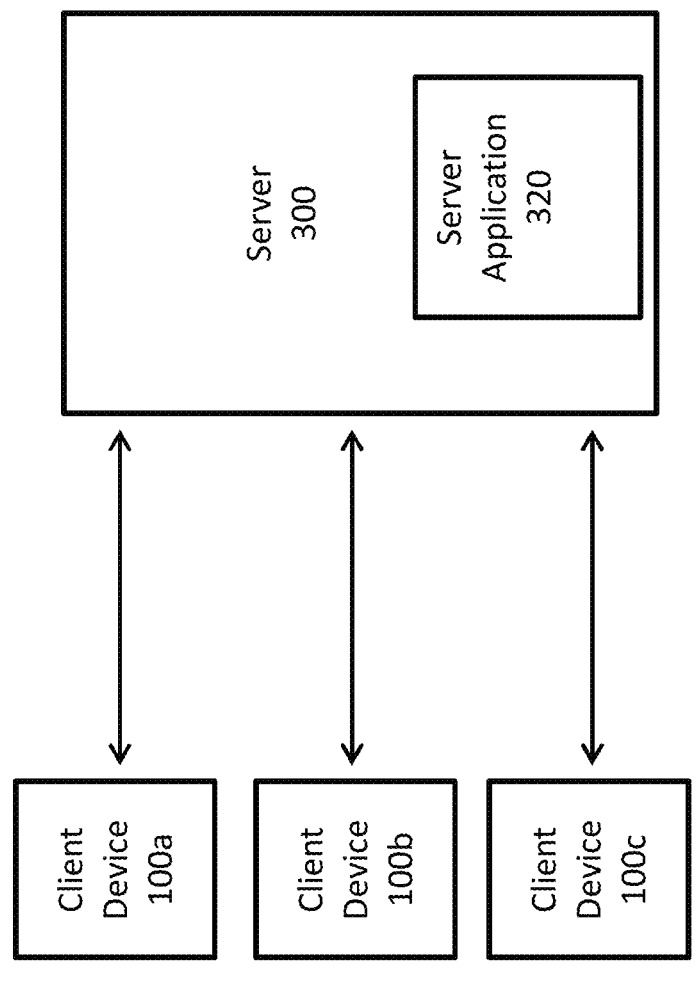
FIG. 3 depicts a plurality of client devices in communication with a server.

With reference to FIG. 3, three instantiations of client device 100 are shown, client devices 100*a*, 100*b*, and 100*c*. These are exemplary devices, and it is to be understood that any number of different instantiations of client device 100 can be used.

Client devices 100*a*, 100*b*, and 100*c* each communicate with server 300 using network interface 150. Server 300 runs server application 320. Server application 320 comprises lines of software code that are designed specifically to interact with client application 220.

Figure 4:
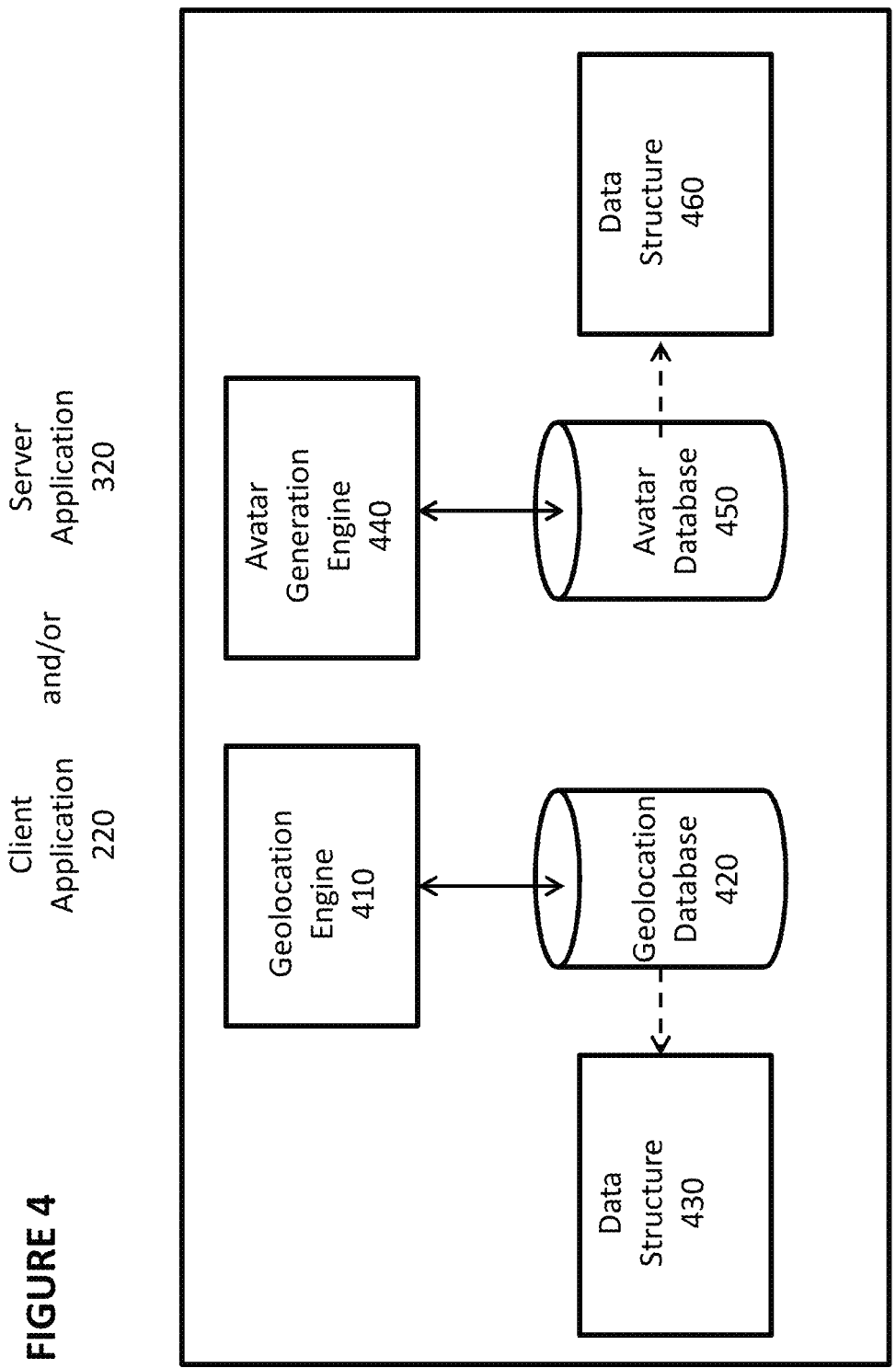
FIG. 4 depicts a geolocation engine and avatar generation engine.

FIG. 4 depicts engines contained within client application 220, within server application 320, or split between client application 220 and server application 320. One of ordinary skill in the art will understand and appreciate that the functions described below can be distributed between server application 320 and client application 220.

Client application 220 and/or server application 320 comprise geolocation engine 410, geolocation database 420, avatar generation engine 440, and avatar database 450. Geolocation engine 410 and avatar generation engine 440 each comprises lines of software code executed by processing unit 110 and/or graphics processing unit 170 to perform certain functions. Geolocation database 420 and avatar database 450 are databases using known database technology, such as relational database technology. In this example, geolocation database 420 stores exemplary data structure 430, and avatar database 450 stores exemplary data structure 460. Data structures 430 and 460 can comprise one or more tables or other known database structures.

Figure 5:
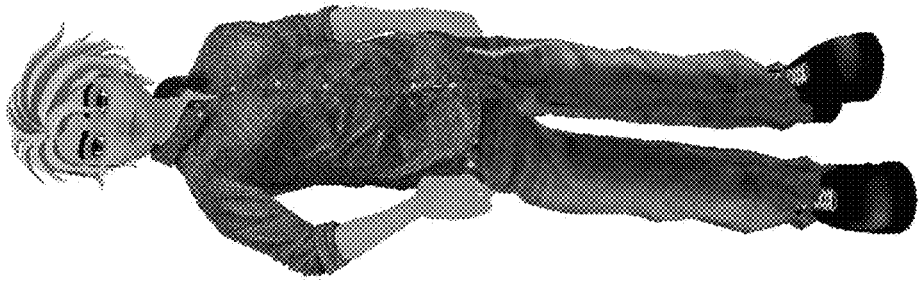
FIG. 5 depicts an exemplary data structure associated with an avatar.

FIG. 5 depicts aspects of creating an avatar. In this example, a user operates computing device 100*a*, which interacts with server 300. Using client application 220, user initiates an avatar creation method. The user builds the avatar by selecting options, providing input data, and/or otherwise defining characteristics of an avatar. These data and characteristics are captured in data structure 460, which will be stored in avatar database 450.

Data structure 460 comprises or defines object 501*a*, which corresponds to an instantiation of an avatar. Object 501*a* comprises object identifier 502*a*, appearance sub-object 503, action sub-object 507, location sub-object 510, and any number of other sub-objects.

Appearance sub-object 503 is used to define the appearance of the avatar and comprises a plurality of characteristics, such as characteristics 504, 505, and 506. Examples of characteristics 504, 505, and 506 might include height, head shape, hair texture, hair color, eye shape, eye color, upper body clothing, lower body clothing, jewelry, glasses, etc.

Action sub-object 507 is used to define actions that an avatar is able to perform and comprises a plurality of characteristics, such as characteristics 508 and 509. Examples of characteristics 508 and 509 might include waving a hand, winking, doing a hand-stand, doing a break-dancing move, nodding, etc.

Location sub-object 510 is used to define the location of an avatar and comprises a plurality of characteristics 511 and 512. Examples of characteristics 511 and 512 might include latitude data, longitude data, and radius (which can be used to generate a geofence around a certain location defined by latitude data and longitude data).

Object 501*a* optionally can be processed by client application 220 or server application 320 to generate avatar image 510.

An embodiment for associating an avatar with a location and preserving the state of that avatar for future interactions with others will now be described with reference to FIGS. 6A-6B.

Figure 6A:
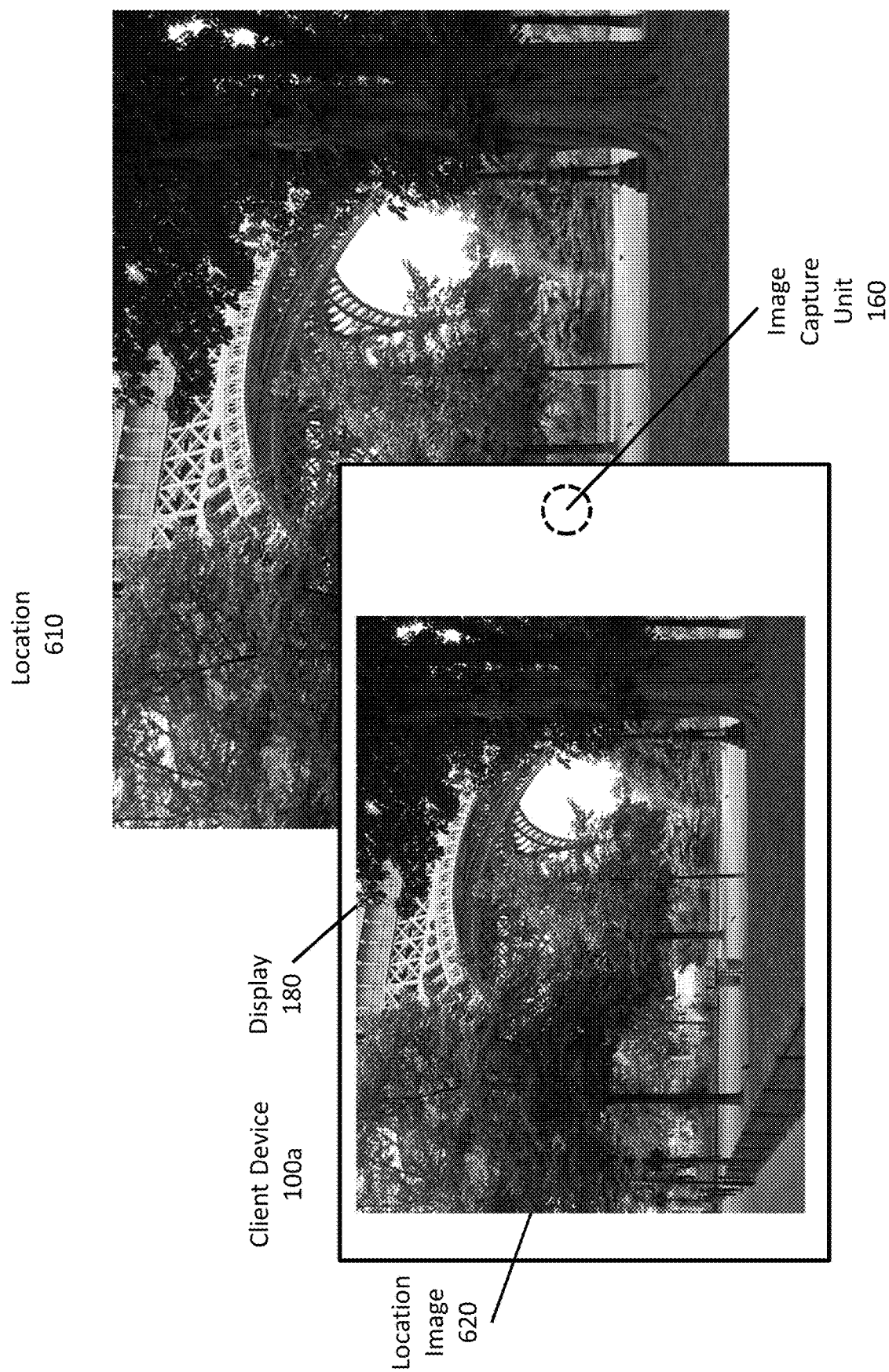
FIG. 6A depicts the viewing of a first physical location using a client application on a first client device.

In FIG. 6A, the user operating client device 100*a* visits location 610, which is a physical location. In this example, location 610 is at the base of the Eifel Tower in Paris, France. The user holds up client device 100*a* and operates client application 620. Image capture unit 160 (which here is on the hidden side of client device 100*a*, facing the Eifel Tower) captures an image of location 610, and displays it as location image 620 on display 180.

In FIG. 6B, the user operates client application 620 to associate an avatar with location 610. This results in two data structures being created or updated.

First, data structure 430 is created or updated. This is a data structure that is stored and/or will be stored in geolocation database 420. Data structure 430 captures data for location 610. In this example, it creates object 601*a* for location 610. Object 601*a* comprises object identifier 602*a* and location data 603 (which, for example, can be latitude data and longitude data obtained from positioning unit 140). Object 601*a* also comprises, in this example, object identifier 501*b*, which is an identifier for an object associated with an avatar that has been placed at location 610 by a user, discussed further below. Optionally, location data 603 can comprise a specific point identified by positioning data, or it can comprise a physical area, such as a geofenced area specified by a circle centered at the point specified by the positioning data and a radius that was stored as characteristic 518 in location sub-object 516 (e.g., 100 meters).

Second, data structure 460 is created or updated. This is a data structure that is stored and/or will be stored in avatar database 450. Here, it is assumed that data structure 460 already exists because the user previously had created an avatar as discussed in FIG. 5, although the avatar instead could be created "on the fly" while the user is at location 610. Object 501*b* is created, which corresponds to another instantiation of the avatar, and is identified by object identifier 502*b*. Object 501*b* initially is a duplicate of object 501*a* and comprises appearance sub-object 503 and characteristics 504, 505, and 506. Thus avatar image 630 appears to be the same image as avatar image 510 shown in FIG. 5.

In this example, object 501*b* further comprises action sub-object 513, which captures different characteristics (characteristics 514 and 515) compared to action sub-object 507 in object 501*a*. Here, characteristic 514 might comprise an instruction or identification sequence that causes avatar image 630 to wave his or her right hand when a user first views avatar image 630. Characteristic 515 might be to play back a voice recording from user when a particular user first views avatar image 630 (e.g., "Hi, John!").

Location sub-object 516 comprises characteristics 517 and 518, which are different than characteristics 511 and 512 in location sub-object 510 in object 501a. For example, characteristic 511 can be latitude and longitude data for location 610 (Example: 48.858093, 2.294694) Characteristic 512 can be a radius set by the user of client device 100a to indicate a geofenced area in which avatar image 630 can be invoked (e.g., 100 meters from the location indicated in characteristic 511).

Access sub-object 519 can be used to specify the users or computing devices that can have access to object 501b. Characteristic 520 might be, for example, a list of specific users or computing devices, or an identifier for the user's social network.

Once established, data structure 460 is stored in avatar database 450.

Figure 7:
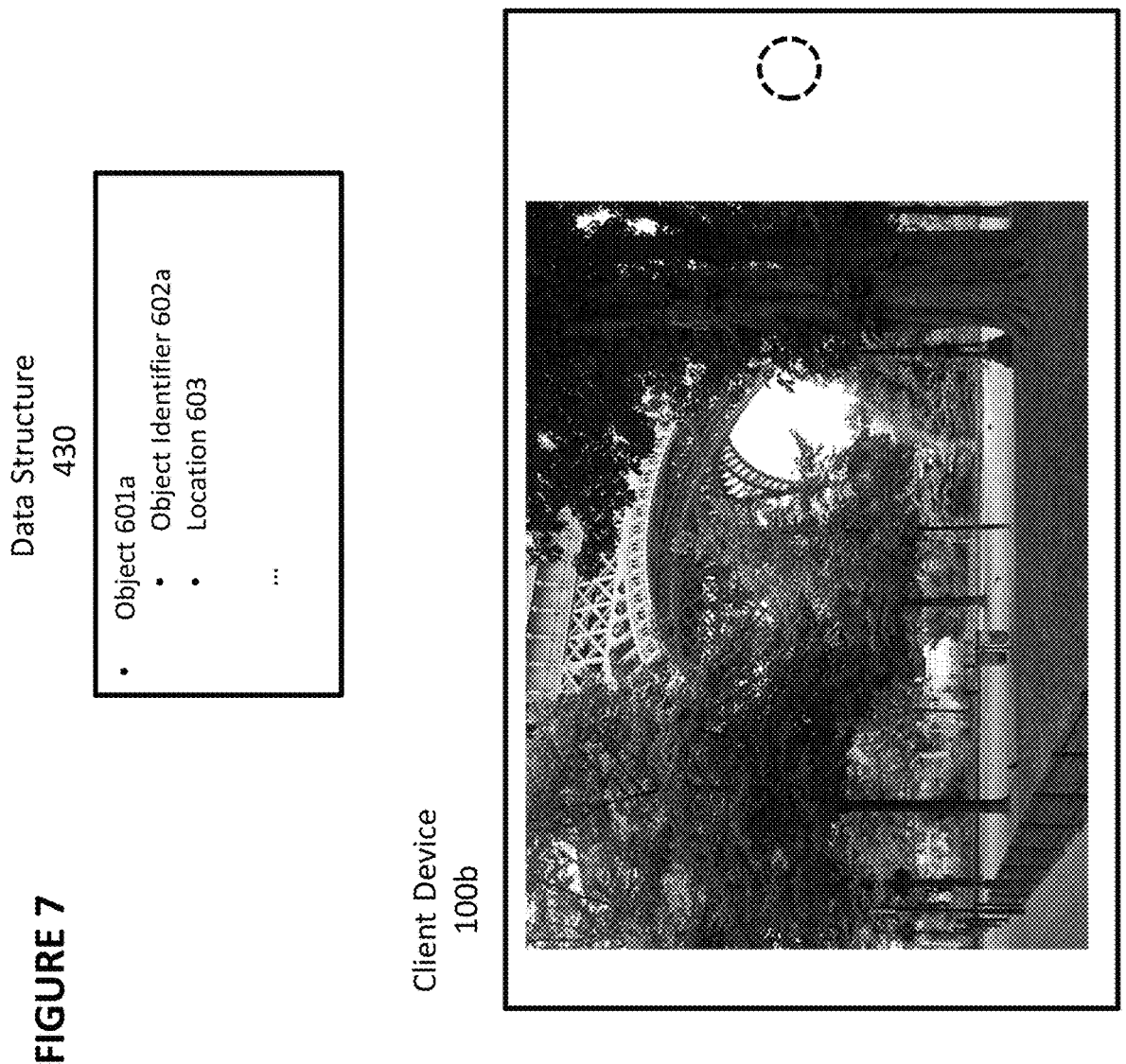
FIG. 7 depicts an interaction between a second user using the client application on a second client device at the first physical location.

FIGS. 7 and 8 depict an embodiment where users operating other client devices 100 later visit location 610 and operate client application 220.

In FIG. 7, a user operating client device 100b goes to (or near) location 610 and operates client application 220. Client device 100b and client application 220, using positioning unit 140, capture location data for client device 100b (e.g., 48.858093, 2.294694 or something nearby, such as 48.85092, 2.294696). That data is provided to server 300. Server application 320 and/or client application 220 make a query containing that location data to geolocation database 420. Geolocation database 420 identifies object 601a, which indicates that Avatar Object Identifier 502ba is associated with that particular location (which is also stored in location data 603) or is within a threshold distance (e.g., 100 feet) from that particular location. The query therefore yields object 501b. Access sub-object 513 in object 501b is then analyzed, and it is determined that the user of client device 100b does not have access rights to object 501b. Therefore, nothing is displayed on client device 100b other than an image for location 610 itself.

In FIG. 8, a user operating client device 100c goes to (or near) location 610 and operates client application 220. Client device 100c and client application 220, using positioning unit 140, capture location data for client device 100b (e.g., 48.858093, 2.294694 or something nearby, such as 48.85092, 2.294696). That data is provided to server 300. Server application 320 and/or client application 220 make a query containing that location data to geolocation database 420. Geolocation database 420 identifies object 601a, which indicates that Avatar Object Identifier 502b is associated with that particular location (which is also stored in location data 603) or is within a threshold distance (e.g., 100 feet) from that particular location. The query therefore yields object 501b. Access sub-object 513 in object 501b is then analyzed, and it is determined that the user of client device 100c does have access rights to object 501b. Thereafter, an image for location 610 is displayed on client device 100c, along with avatar image 630 optionally superimposed on the image for location 610. Avatar image 630 optionally can perform the actions specified by action sub-object 513 (e.g., hand wave with the voice recording "Hi, John!").

Figure 9:
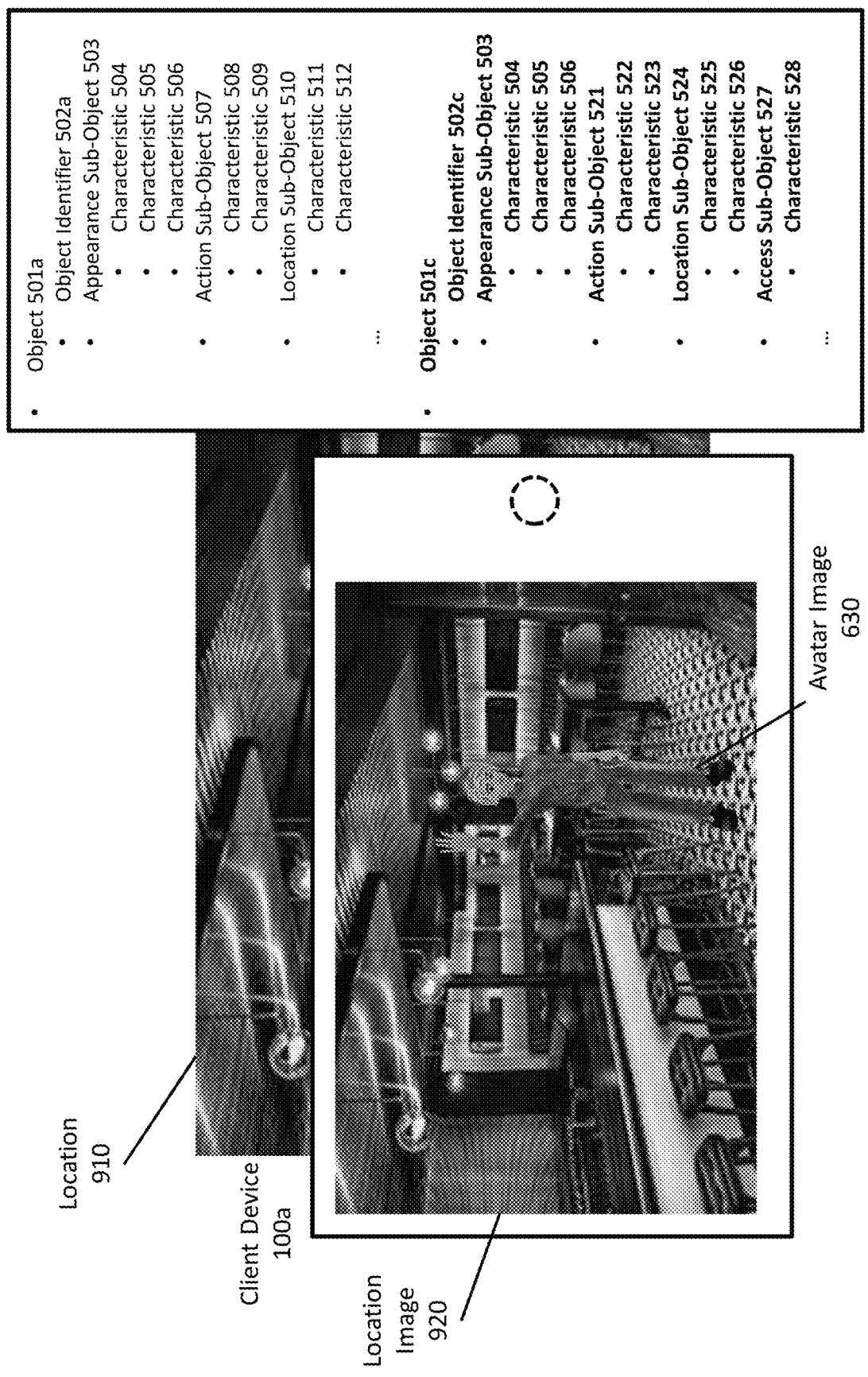
FIG. 9 depicts the placement of an avatar at a second physical location using the client application on the first client device.

Using these embodiments, a user can plant avatar instantiations in an unlimited number of locations for any number of other users For example, in FIG. 9, the user of client device 100a generates object 501c at location 910 (captured in location image 920), using the same process described previously with reference to FIGS. 6A and 6B. This can occur even though object 501b is still "alive" at location 610.

References to the present invention herein are not intended to limit the scope of any claim or claim term, but instead merely make reference to one or more features that may be covered by one or more of the claims. Materials, processes and numerical examples described above are exemplary only, and should not be deemed to limit the claims. It should be noted that, as used herein, the terms "over" and "on" both inclusively include "directly on" (no intermediate materials, elements or space disposed there between) and "indirectly on" (intermediate materials, elements or space disposed there between). Likewise, the term "adjacent" includes "directly adjacent" (no intermediate materials, elements or space disposed there between) and "indirectly adjacent" (intermediate materials, elements or space disposed there between). For example, forming an element "over a substrate" can include forming the element directly on the substrate with no intermediate materials/elements there between, as well as forming the element indirectly on the substrate with one or more intermediate materials/elements there between.

What is claimed is:

1. A method of providing an avatar in an augmented reality environment, the method comprising:
   receiving, by a server from a first client device operated by a first user, a first set of latitude and longitude data for a first physical position and data indicating an action for an avatar;
   storing, by the server, the first set of latitude and longitude data, an identifier for the avatar, and the data indicating an action for an avatar;
   receiving, by the server from a second client device, a second set of latitude and longitude data for a second physical position;
   determining, by the server, that the distance between the first physical position and the second physical position is below a predetermined threshold;
   determining, by the server, that access rights for the avatar exist for a second user operating the second client device;
   transmitting, by the server, the avatar and the data indicating an action for the avatar to the second client device;
   capturing, by an image capture device in the second client device, an image; and
   displaying, by the second client device, the avatar over the image, wherein the avatar performs the action without real-time input from the first client device or the first user.

2. The method of claim 1, wherein the action comprises movement by the avatar.

3. The method of claim 1, wherein the action comprises playing, by the second client device, audio data received from the server.

4. The method of claim 3, wherein the data audio comprises a voice recording captured by the first client device.

5. The method of claim 1, further comprising:
   receiving, by the server from the first client device, a third set of latitude and longitude data for a third physical position and data indicating a second action for the avatar;
   storing, by the server, the third set of latitude and longitude data, the identifier for the avatar, and the data indicating the second action for the avatar;
   receiving, by the server from a third client device, a fourth set of latitude and longitude data for a fourth physical position;
   determining, by the server, that the distance between the third physical position and the fourth physical position is below a second predetermined threshold;

determining, by the server, that access rights for the avatar exist for a user of the third client device;

transmitting, by the server, the avatar and the data indicating the second action to the third client device;

capturing, by the third client a device, a second image; and displaying, by the third client device, the avatar superimposed over the second image, wherein the avatar performs the second action without real-time control of the avatar by the first client device.

6. The method of claim 5, wherein the second action comprises movement by the avatar.

7. The method of claim 5, wherein the second action comprises playing audio data received from the server.

8. A server for providing an avatar in an augmented reality environment, the server comprising:
 a network interface;
 a processing unit; and
 a computer medium storing instructions that when executed by the processing unit cause the server to perform the following steps:
  receive, from a first client device, operated by a first user, over the network interface, a first set of latitude and longitude data for a first physical position and data indicating an action for an avatar;
  store the first set of latitude and longitude data, an identifier for the avatar, and the data indicating an action for the avatar;
  receive, from a second client device over the network interface, a second set of latitude and longitude data for a second physical position;
  determine that the distance between the first physical position and the second physical position is below a predetermined threshold;
  determine that access rights for the avatar exist for a user of the second client device; and
  transmit, to the second client device over the network interface without real-time input from the first client device or the first user, the avatar and the data indicating an action for the avatar.

9. The server of claim 8, wherein the action comprises movement by the avatar.

10. The server of claim 8, wherein the action comprises playing audio data.

11. The server of claim 10, wherein the audio data comprises a voice recording captured by the first client device.

12. The server of claim 8, wherein the computer medium further stores instructions that when executed by the processing unit cause the server to perform the following steps:
 receive, from the first client device over the network interface, a third set of latitude and longitude data for a third physical position and data indicating a second action for the avatar;
 store the third set of latitude and longitude data, the identifier for the avatar, and the data indicating the second action for the avatar;
 receive, from a third client device over the network interface, a fourth set of latitude and longitude data for a fourth physical position;
 determine that the distance between the third physical position and the fourth physical position is below a second predetermined threshold;
 determine that access rights for the avatar exist for a user of the third client device; and
 transmit, to the third client device over the network interface without real-time control by the first client device, the avatar and the data indicating the second action for the avatar.

13. The method of claim 12, wherein the second action comprises movement by the avatar.

14. The method of claim 12, wherein the second action comprises playing audio data received from the server.

15. A system for generating an avatar in an augmented reality environment, the system comprising:
 a first client device comprising a positioning unit configured to capture a first set of latitude and longitude data for a first physical position, the first client device configured to determine an action for an avatar in response to a first user;
 a server configured to receive and store the first set of latitude and longitude data and data indicating the action for the avatar and to associate the first set of latitude and longitude data and the action for the avatar with an identifier for an avatar; and
 a second client device configured to:
  capture, using a positioning unit, a second set of latitude and longitude data for a second physical position, wherein the distance between the first physical position and the second physical position is below a predetermined threshold;
  capture, by an image capture device, an image; and
  display, on a display of the second client device in response to a communication from the server, the avatar superimposed on the image, wherein the avatar performs the action without real-time input from the first client device or the first user.

16. The system of claim 15, wherein the second client device is configured to display the avatar superimposed on the image only if the user of the second client device is provided access rights to the avatar.

17. The system of claim 15, wherein the action comprises movement by the avatar.

18. The system of claim 15, wherein the action comprises playing audio received from the server.

19. The system of claim 18, wherein the audio comprises a voice recording captured by the first client device and stored by the server.

20. The system of claim 15,
 wherein the server is further configured to receive and store a third set of latitude and longitude data and data indicating a second action for the avatar specified by the first client device and to associate the third set of latitude and longitude data and the data indicating the second action for the avatar with the identifier for an avatar; and
 wherein the system further comprises a third client device configured to:
  capture, using a positioning unit, a fourth set of latitude and longitude data for a fourth physical position, wherein the distance between the third physical position and the fourth physical position is below a second predetermined threshold;
  capture, by an image capture device, an image; and
  display, on a display of the third client device in response to a communication from the server, the avatar superimposed on the image, wherein the avatar performs the second action without real-time control of the avatar by the first client device.

21. The method of claim 20, wherein the second action comprises movement by the avatar.

22. The method of claim 20, wherein the second action comprises playing audio data received from the server.

\* \* \* \* \*